United States Patent [19]
Bardon et al.

[11] Patent Number: 5,767,855
[45] Date of Patent: Jun. 16, 1998

[54] SELECTIVELY ENLARGED VIEWER INTERACTIVE THREE-DIMENSIONAL OBJECTS IN ENVIRONMENTALLY RELATED VIRTUAL THREE-DIMENSIONAL WORKSPACE DISPLAYS

[75] Inventors: Didier Daniel Claude Bardon, Austin; Scott Harlan Isensee, Georgetown, both of Tex.

[73] Assignee: International Business Machines Corporation, Armonk, N.Y.

[21] Appl. No.: 861,310

[22] Filed: May 19, 1997

[51] Int. Cl.$^6$ .................... G06F 15/00; G06T 15/00
[52] U.S. Cl. .................... 345/355; 345/334; 345/419; 345/349
[58] Field of Search .................... 345/339, 348, 345/349, 351, 355, 419, 439

[56] References Cited

U.S. PATENT DOCUMENTS

| | | | |
|---|---|---|---|
| 4,831,556 | 5/1989 | Oono | 364/521 |
| 5,195,174 | 3/1993 | Kagawa | 395/102 |
| 5,204,959 | 4/1993 | Sakuragi | 395/600 |
| 5,369,735 | 11/1994 | Thier et al. | 395/123 |
| 5,388,202 | 2/1995 | Squires et al. | 395/157 |
| 5,566,284 | 10/1996 | Wakayama | 395/130 |
| 5,592,597 | 1/1997 | Kiss | 395/119 |
| 5,594,842 | 1/1997 | Kaufman et al. | 395/124 |
| 5,594,844 | 1/1997 | Sakai et al. | 395/127 |
| 5,682,469 | 10/1997 | Linnett et al. | 345/334 X |
| 5,689,628 | 11/1997 | Robertson | 345/355 |
| 5,689,669 | 11/1997 | Lynch et al. | 345/355 |

*Primary Examiner*—Raymond J. Bayerl
*Assistant Examiner*—Chadwick A. Jackson
*Attorney, Agent, or Firm*—J. B. Kraft

[57] ABSTRACT

A system, method and computer program are provided for a virtual three-dimensional workspace wherein the three-dimensional objects and the workspace in general are environmentally associated, particularly in real world size relationships. In the default or normal workspace, all of the objects are sized relative to each other so that the relative sizing is the same as it would be in the real world. However, in order to provide the viewer ease of use when the viewer has selected particular functional objects for interaction, the system has stored for each of such functional objects an enlarged image of the object. This image is stored associated with the object and is displayed upon the selection of the object by the user. When the user has completed the interaction with the object by way of its enlarged image, the three-dimensional object returns to its default or real world sized image in the three-dimensional workspace.

10 Claims, 6 Drawing Sheets

SELECTIVELY ENLARGED VIEWER INTERACTIVE THREE-DIMENSIONAL OBJECTS IN ENVIRONMENTALLY RELATED VIRTUAL THREE-DIMENSIONAL WORKSPACE DISPLAYS

TECHNICAL FIELD

The present invention relates to user interactive computer supported display technology and particularly to such user interactive systems and methods which are user friendly, i.e. provide even non-computer-literate users with an interface environment which is easy to use and intuitive.

BACKGROUND OF THE INVENTION AND PRIOR ART

The 1990's decade has been marked by a societal technological revolution driven by the convergence of the data processing industry with the consumer electronics industry. This advance has been even further accelerated by the extensive consumer and business involvement in the internet over the past two years. As a result of these changes, it seems as if virtually all aspects of human endeavor in the industrialized world requires human-computer interfaces. As a result of these profound changes, there is a need to make computer directed activities accessible to a substantial portion of the world's population which, up to a year or two ago, was computer-illiterate, or at best computer indifferent. In order for the vast computer supported market places to continue and be commercially productive, it will be necessary for a large segment of computer indifferent consumers to be involved in computer interfaces. Thus, the challenge of our technology is to create interfaces to computers which are as close to the real world as possible.

Industry has been working towards this challenge and there is presently a relatively high degree of realism possible in interfaces. This presents a need and an opportunity for even more realistic interaction techniques to better match the visual metaphors used and to achieve a higher level of ease of use for computer systems. We are striving towards the representation of object as photo realistic, three-dimensional (3D) models rather than as the icons and two-dimensional desktops of conventional computer technology.

Some examples of current technology for the creation of virtual three-dimensional workspace display interfaces are copending application Ser. No. 08/813,891, entitled "VIEWER INTERACTIVE OBJECT IN VIRTUAL THREE-DIMENSIONAL WORKSPACE" and Ser. No. 08/813,848, entitled "VIEWER INTERACTIVE OBJECT WITH MULTIPLE SELECTABLE FACE VIEWS IN VIRTUAL THREE-DIMENSIONAL WORKSPACE", assigned to the Assignee of the present application.

A 3D virtual workspace display environment is also described in an article entitled, "RAPID CONTROLLED MOVEMENT THROUGH A VIRTUAL 3D WORKSPACE", Jock Mackinlay et al., *Computer Graphics Publication*, Vol. 24, No. 4, August 1990, pp. 171–175, as well as in its related U.S. Pat. No. 5,276,785.

It is clear that current technology in virtual three-dimensional workspaces has provided environments which are user friendly, i.e. make the casual computer user feel more comfortable and at home with the interface. However, researchers in human factors have found downsides to three-dimensional virtual reality displays. Because of the many choices that the user has in wandering down various "streets and roads" or visiting a wide variety of "buildings or stores" or going through many possible "doors", the user may wander through this reality and perhaps get lost from the track or goal he is pursuing.

The present invention addresses this problem, i.e. that of helping the interactive user in three-dimensional graphic environments to stay focused and relate to the objects which he is seeking to relate to and in the manner in which he is seeking to relate to such objects even though these objects are arranged in three-dimensional space in what appears to be almost infinite configurations. The invention facilitates the user's navigation in the 3D space so that the user may easily and quickly return to his navigational path and objectives once he has completed his interaction with his selected three-dimensional objects.

SUMMARY OF THE INVENTION

Before setting forth the present invention, we should establish some basic characteristics of the virtual three-dimensional environment as described in the above-referenced patents and applications.

It is understood that in order to navigate through three-dimensional space, view the space or relate to objects within the space, a viewpoint is determined within that space. That viewpoint is the virtual position of the viewer or person who is navigating within the three-dimensional space. The viewpoint is commonly defined by its position and its orientation or direction. For purposes of describing this invention, we will use the metaphor of a camera to understand the viewpoint. The camera's position and orientation are where it is and which way it is pointing. Let us refer to another property of a viewpoint which is "field of view"; this is effectively the resulting view from a given viewpoint. A key need of a viewer navigating through virtual three-dimensional space is to stay focused and navigate as easily as possible. This will permit the user to concentrate and focus on his planned tasks and then to return to an environment which orients the viewer for future navigation.

The present invention operates within the previously described data processor control display system for displaying virtual three-dimensional workspaces having interactive three-dimensional objects which may be accessed by the viewer for a variety of interactive functions. The three-dimensional workspace is laid out in what may be referred to as a "world view". All three-dimensional objects within this world view, whether such objects are viewer interactive, navigational objects, i.e. objects which are present to aid the viewer in navigating through the workspace, or environmental objects, i.e. contribute to the overall environment, are related to one another. All the objects could be said to be environmentally related or associated, i.e. they are visually interrelated to provide the viewer with a visually stimulating workspace within which the viewer may become oriented for navigation as easily as possible. Thus, the objects should look and behave like their real world counterparts. This means that the objects should share characteristics and measurements resembling the real world. However, real world relative sizes in a three-dimensional workspace for particular objects are frequently so relatively small that if the particular object were selected by the viewer or user for functional interaction, such interaction would be at best difficult, if not impossible. The present invention addresses this problem by providing within a real world virtual threedimensional workspace of three-dimensional objects; a plurality of such objects are user interactive. These objects have a normal size realistically consistent with all of the objects environmentally associated within the workspace. In addition, there is stored for each of these functional objects an enlarged image of the respective object. Then, when the user or viewer selects such an object for a particular functional interaction, the system provides means responsive to such a selection for display the stored enlarged image. Once the viewer or user has completed the interactive function with respect to the object, means are then provided for returning the display of the selected object to its normal size which is environmentally compatible with all of the objects in the workspace. This permits the viewer a restored three-dimensional environment from which he may now more readily navigate to the next of his desired functional interaction with objects.

The enlarged image of the object may either be three-dimensional or two-dimensional. In addition, means may be provided for automatically returning the enlarged functional objects to their original real world or default size when the functional interaction with the viewer or user ends.

DETAILED DESCRIPTION OF THE PREFERRED EMBODIMENT

Before going into the details of specific embodiments, it will be helpful to understand from a more general perspective the various elements and method which may be used to implement the present invention. The present invention is implemented in three-dimensional virtual workspace. A three-dimensional workspace is a workspace that is perceived as extending in three orthogonal directions. Typically a display has a two-dimensional display surface and the perception of a third dimension is effected by visual clues such as perspective lines extending toward a vanishing point. Distant objects are obscured by nearer objects. The three-dimensional effect is also provided by showing changes in objects as they move toward or away from the viewer. Perspective shading of objects and a variety of shadowing of objects at different distances from the viewer also contribute to the three-dimensional effect.

A three-dimensional workspace is typically perceived as being viewed from a position within the workspace. This position is a viewpoint. This viewpoint provides the virtual interface between the display user and the display. The viewpoint's direction of orientation is the direction from the viewpoint into the field of view along the axis at the center of the field of view.

In order to present a three-dimensional workspace, a system may store data indicating "coordinates" of the position of an object, a viewpoint or other display feature in the workspace. Data indicating coordinates of a display feature can then be used in presenting the display feature so that it is perceptible as positioned at the indicated coordinates. The "distance" between two display features is the perceptible distance between them, and can be determined from their coordinates if they are presented so that they appear to be positioned at their coordinates.

Techniques for providing and handling three-dimensional objects in a three-dimensional virtual workspace have been developed in the art and are available to display user interface designers. U.S. Pat. 5,276,785 (Mackinlay et al., Jan. 4, 1994) is an example of the design techniques available to such three-dimensional workspace interface designers.

The three-dimensional workspace or landscape is navigable using conventional three-dimensional navigation techniques. A user may move around or navigate within the three-dimensional data representation to alter his perspective and view of the displayed representation of the data. Thus, a user may be referred to as a navigator. The navigator is actually stationary, and his view of the display space changes to give him the sensation of moving within the three-dimensional graphical space. Thus, we speak in terms of the navigator's perceived motion when we refer to changes in his view of the display space. As the user moves, his view of the data changes accordingly within the threedimensional data representation. Some navigation modes include browsing, searching and data movement. U.S. Pat. 5,555,354 (Strasnick et al., Sep. 10, 1996) describes some known navigation techniques.

The embodiments of the present invention may be implemented using object-oriented programming techniques using C++compiled programming language. The programs are written in human readable script and this script is provided to another program called a compiler to generate a machine readable numeric code which can be loaded into, and directly executed by the computer. The C++language possesses certain characteristics which allow a software developer to easily use programs written by others while still providing a great deal of control over the reuse of programs to prevent their destruction or improper use. The C++language is well known and many articles and text are available which describe the language in detail.

While the embodiment of the present invention, which will be subsequently described, can be implemented using object oriented techniques involving the C++programming language, we found it preferable to use SCL as used in VRT: the Virtual Reality Toolkit developed and marketed by Superscape Ltd. having U.S. offices in Palo Alto, Calif. Extensive details of these programming techniques may be found in the Superscape VRT, Reference Manual, Version 4-00, 2d Edition, Jan. 29, 1996.

It should be understood by those skilled in the art that object oriented programming techniques involve the definition, creation, use and instruction of "objects". These objects are software entities comprising data elements and routines, or methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods.

Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related method are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and presents the program from being run.

Polymorphism allows objects and functions which have the same overall format, but which work with different data, to function differently to produce consistent results. For example, an addition method may be defined as variable A +variable B, (A+B). The same format can be used whether the A and B are numbers, characters or dollars and cents. However, the actual program code which performs the addition may differ widely depending on the type of variables which comprise A and B. Thus, each type of variable (numbers, characters and dollars). After the methods have been defined, a program can later refer to the addition method by its common format (A+B) and, during compilation, the compiler will determine which of the three methods to be used by examining the variable types. The compiler will then substitute the proper function code.

A third property of object oriented programming is inheritance which allows program developers to reuse preexisting programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines which are all directed to performing commonly encountered tasks in a particular environment. Such predefined classes and libraries are typically called "frameworks" and essentially provide a prefabricated structure as a basis for creating a working application program.

In object oriented programming such as the previously described VRT software platform, there is provided for the user interface a framework containing a set of predefined interface objects. The framework contains predefined classes which can be used as base classes and a developer may accept and incorporate some of the objects into these base classes, or he may modify or override objects or combinations of objects in these base classes to extend the framework and create customized solutions in particular areas of expertise.

This object oriented approach provides a major advantage over traditional programming since the programmer is not changing the original program, but rather extending the capabilities of the original program.

The above-described Superscape Virtual Reality Toolkit (VRT) provides the architectural guidance and modeling, but at the same time frees developers to supply specific actions unique to the particular problem domain which the developer is addressing. Those skilled in the art will understand how the present invention is implemented using object oriented programming techniques as described above.

With this background of the various expedients which may be used to implement the present invention, the preferred embodiments will now be described.

Figure 1:
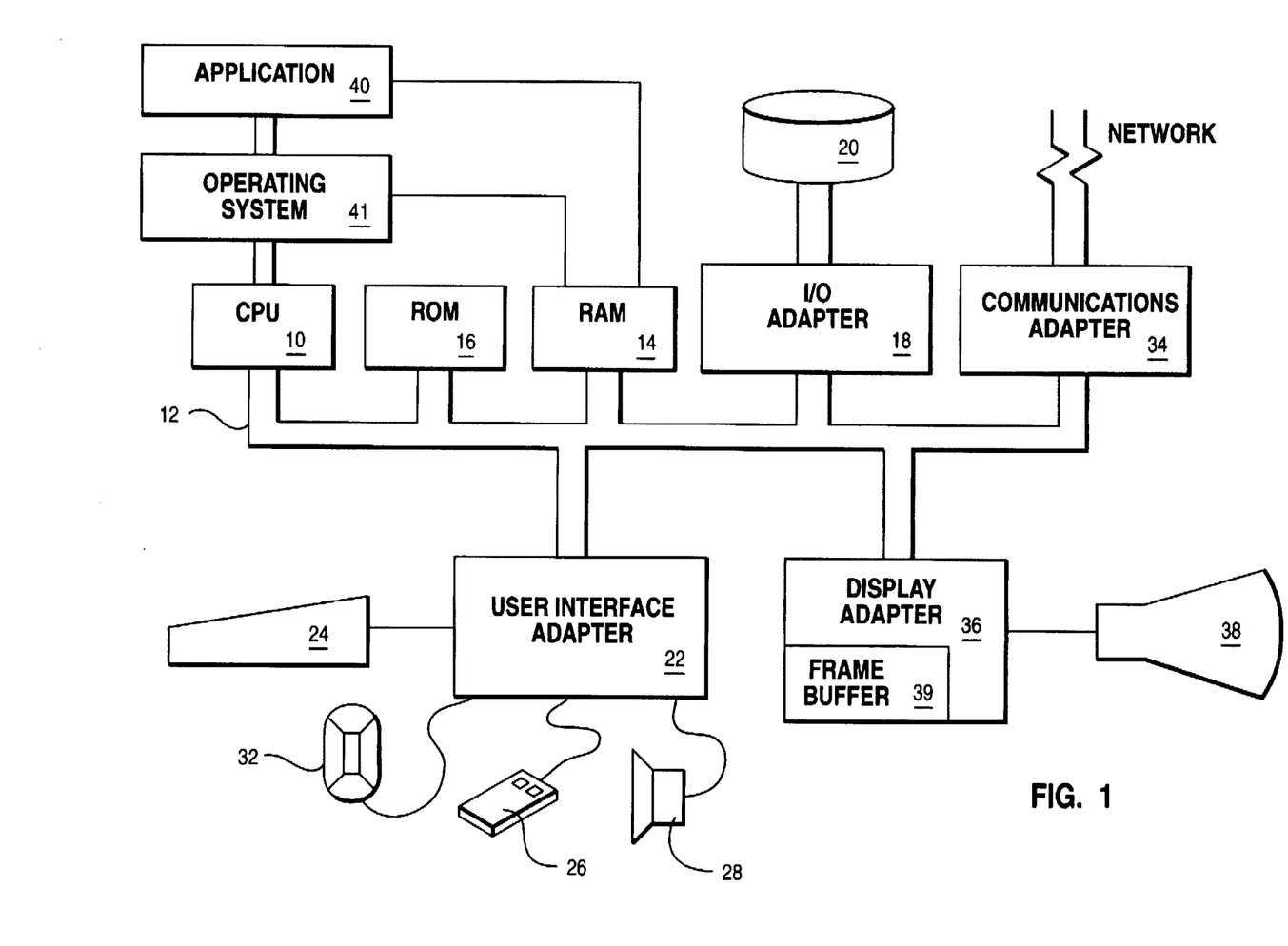
FIG. 1 is a block diagram of a data processing system including a central processing unit which is capable of implementing the present invention.

Referring to FIG. 1, a typical data processing system is shown which may be used in conjunction with object oriented software in implementing the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). A program application such as the program in the above-mentioned VRT platform 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38.

Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described a simple illustration of the present invention. When the images are described, it will be understood that these may be rendered by storing a virtual reality three-dimensional image creation program such as the previously described VRT of Superscape in the RAM 14 of the system of FIG. 1. Also stored on the RAM will be a suitable operating system such as DOS or Windows. The operating system of the VRT application is diagrammatically shown in FIG. 1 as operating system 41 in which application 40 operates.

Figure 2:
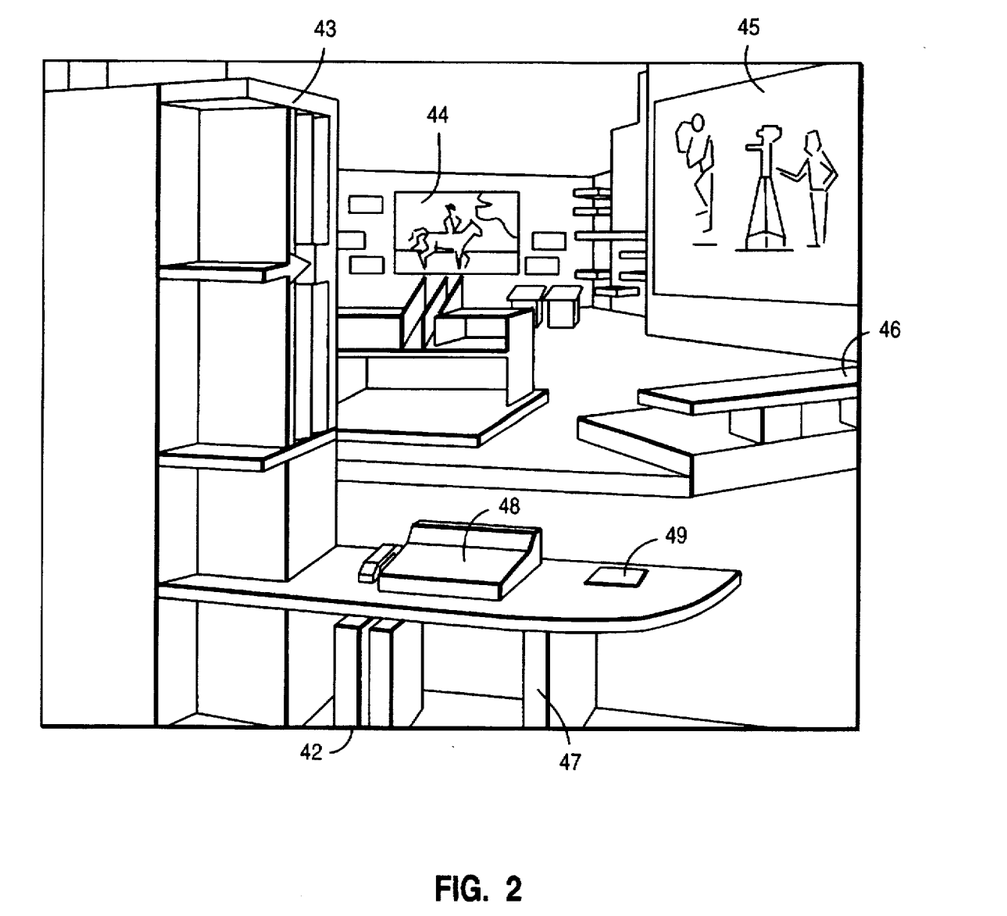
FIG. 2 shows a view of three-dimensional objects in a virtual reality workspace in accordance with the present invention before any object is accessed for functional interaction.

An embodiment of the present invention will now be described with respect to the figures. FIG. 2 represents an initial viewpoint into a portion of a workspace 42. This workspace could be called the world view. It is a room filled with a variety of objects including shelves 43, video screen 44, painting 45, bench 46, desk 47 and a variety of other three-dimensional objects which would make up a portion of a workspace such as an office or even a home entertainment center. All of the objects are realistically sized with respect to one another so as to create a realistic or real world ambience. Note that on desk 47 there are a pair of objects, telephone answering device 48 and a CD 49. As will be hereinafter seen in greater detail, these two objects are important in the illustration of the present invention.

Let us consider the image in FIG. 2 as the initial viewpoint of a three-dimensional space to be presented to the viewer at a display interface such as that which could be shown on display monitor 38 of FIG. 1. In accordance with conventional techniques, the user or viewer may control this viewpoint through conventional I/O devices such as mouse 26 in FIG. 1 which operates through a user interface 22 to call upon the VRT programs in RAM 14 cooperating with the operating system 41 to create images in frame buffer 39 of display adapter 36 to control the display or monitor 38. It should be noted that using conventional virtual three-dimensional workspace navigation techniques, the viewpoint interface with respect to the user as shown in FIG. 2 is changeable as the viewer moves around in the workspace. All of this may be controlled by a suitable I/O device such as mouse 26 of FIG. 1.

Figure 3:
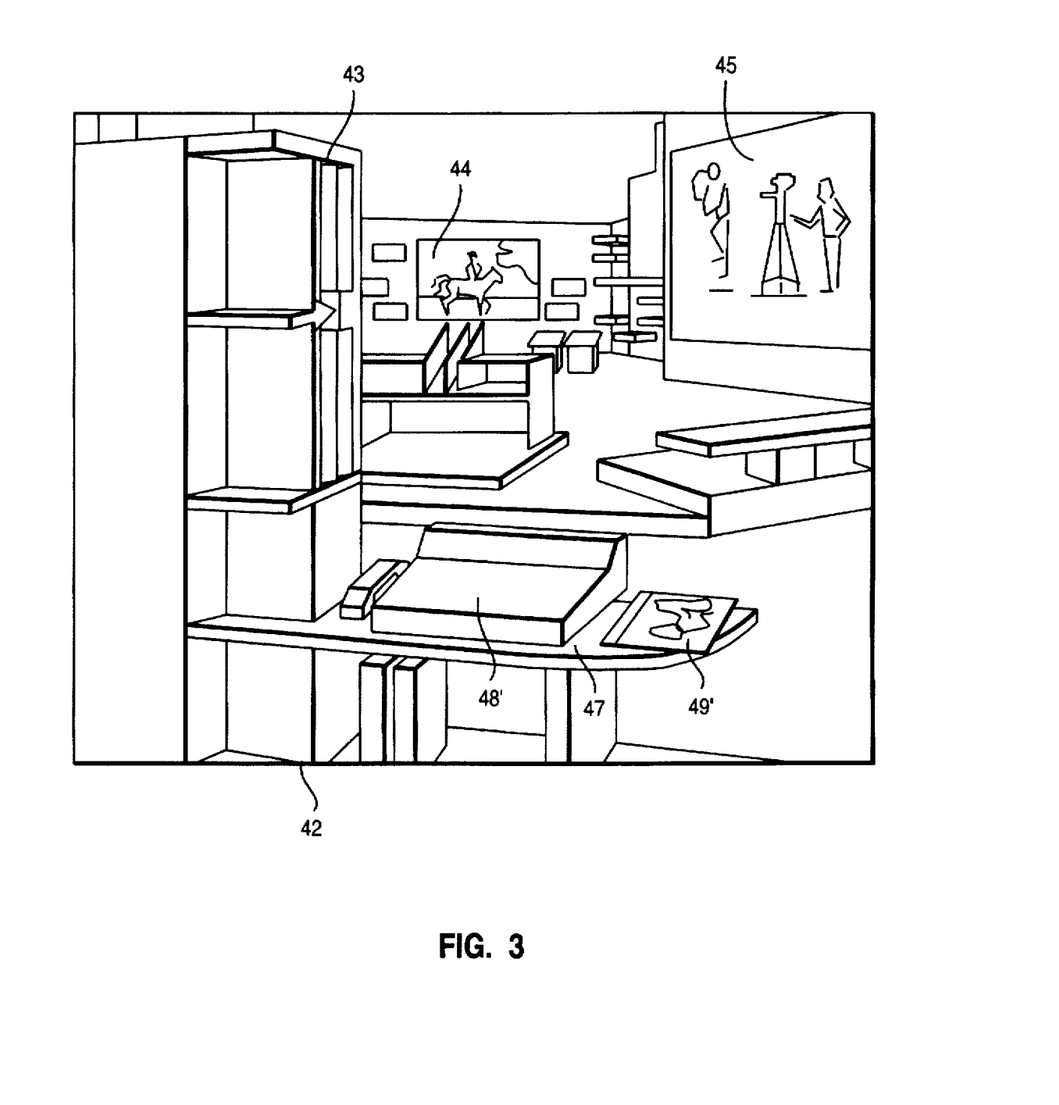
FIG. 3 is a representation of the workspace of FIG. 2 with the enlarged views of two objects presented to the viewer after the viewer has selected these objects for interaction.

Let us assume that the viewer has navigated through the three-dimensional workspace to the portion shown in FIG. 2, and that he now wishes to interact functionally with two of the objects: telephone answering device 48 and CD 49. When the viewer selects these two devices for interaction by any conventional means, such as through mouse 26 in FIG. 1, in order to make these devices easier to use and more accessible to the viewer, the system provides enlarged views of these objects respectively shown as 48' and 49' in FIG. 3. Please note that enlarged image 48' of telephone answering device 48 is over twice as large as the initial object 48 in FIG. 2 and CD 49' in FIG. 3 is about four times as large as the initial CD 49 in FIG. 2. The relative increase in size of these object images in FIG. 3 may be readily seen if they are compared to the desk space on desk 47; in FIG. 2 the two devices occupy a relatively small portion of desk space on desk 47 while in FIG. 3 they occupy practically the whole desktop space of desk 47. The viewer or user may now functionally interact and relate to these enlarged objects for a variety conventional interactive functions. Please note that since the key to the present invention is the enlarged images rather than the functional interaction, for convenience of illustration we have not shown any of the functional interactive details of telephone answering device 48' or CD 49' since this might obscure the point of the present invention. However, it is clear from the above-described comparison that images 48' and 49' in FIG. 3 are enlarged versions of their respective original objects while all of the remaining objects and environmental structures in workspace 42 of FIG. 3 remain unchanged in their realistic size relationships.

Figure 4:
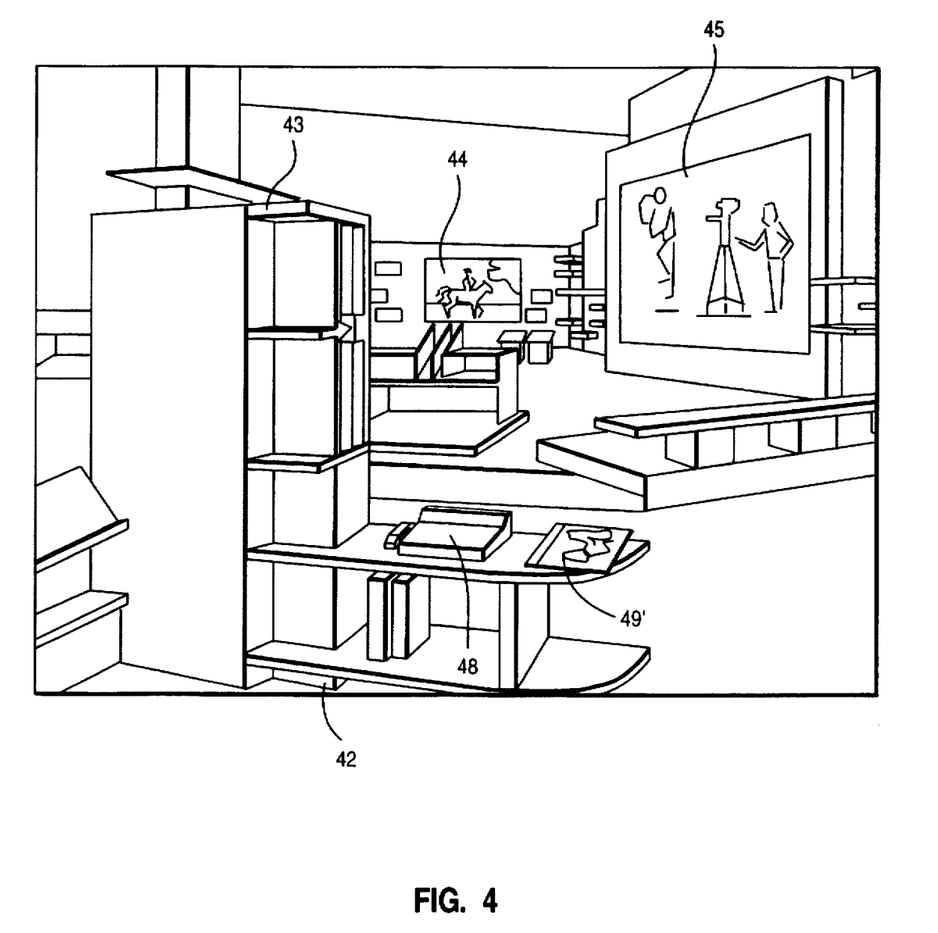
FIG. 4 shows the workspace of FIG. 3 after the viewer has completed interaction with one of said two objects.

Now with respect to FIG. 4, let us assume that the user or viewer has completed his functional interaction with telephone answering device 48 but has not completed his interaction with CD 49. Upon completion of the interaction with telephone answering device 48, it has returned to its original size while the enlarged image 49' of CD 49 still remains. It should be noted that when the viewer or user completed his interaction with telephone answering device 48, the viewer could have triggered the process which returns the object to its original size or the system could be set up to sense the completion of the interaction with respect to the object image and then to return the object image to its original size.

Similarly, when the user finally completes his interaction with respect to enlarged image CD $49^1$, it will be returned to its original size, and the workspace 42 viewpoint will be like that of FIG. 2 again where all the objects in the workspace have defaulted back to their original realistic size relationships.

Figure 5A:
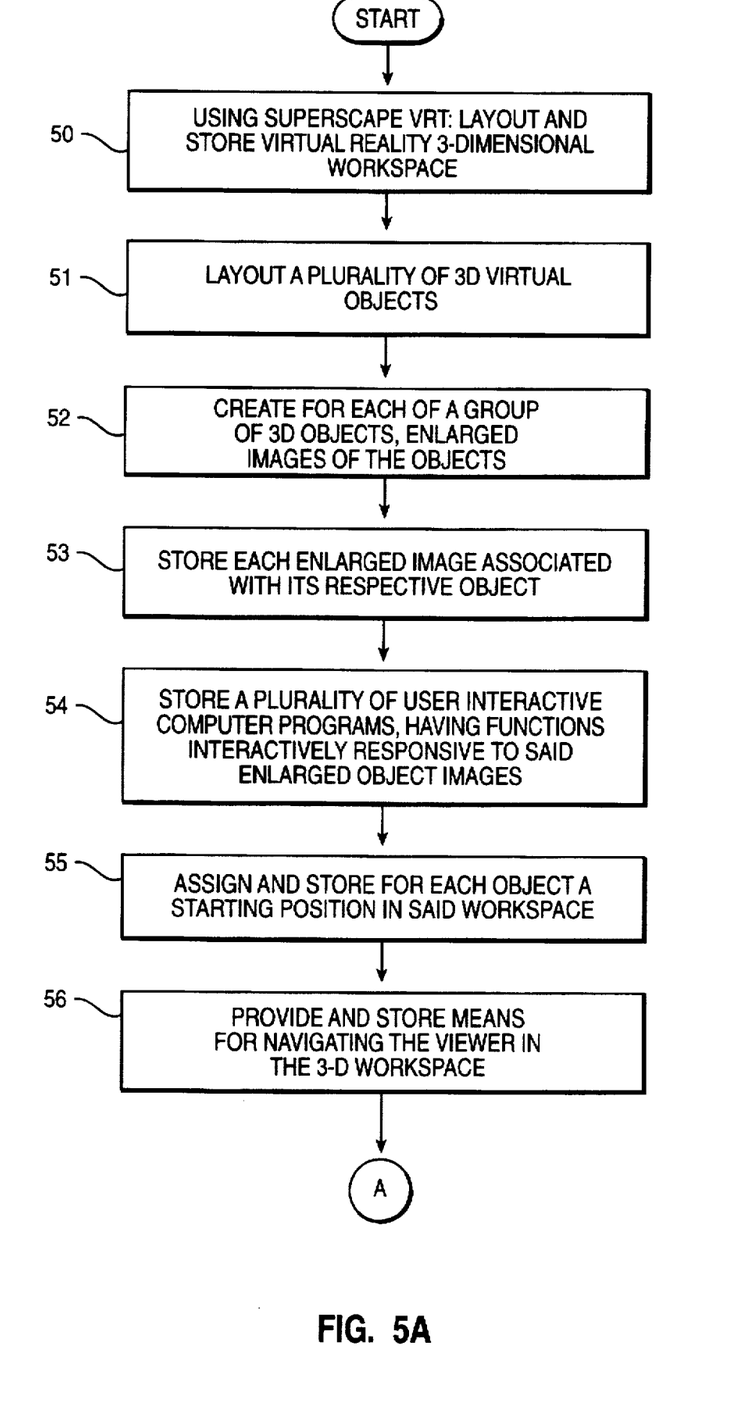
FIGS. 5A and 5B are flowcharts of the process implemented by the present invention (FIG. 5A) and for selectively displaying the enlarged object images in the three-dimensional workspace layout for functional interaction (FIG. 5B).

Now with reference to FIGS. 5A and 5B, there will be described a process implemented by the present invention in conjunction with the flowcharts of 5A and 5B. First, the steps in FIG. 5A relate to the development of the virtual reality workspaces, the three-dimensional objects and their positioning in the workspace in accordance with present invention using the previously described Superscape VRT programming toolkit. It also includes the provision of an enlarged image for each of a plurality of functional three-dimensional objects so that such objects will be easier for the viewer or user to functionally relate to if the object is selected for viewer interaction. First, step 50, FIG. 5A, the desired virtual reality three-dimensional workspace is created and stored. This would be a workspace, for example, a portion of which is shown in FIG. 2. Next, step 51, the three-dimensional objects are laid out with respect to the workspace. These objects have already been described, i.e. shelves 43, TV 44, painting 45, bench 46, as well as desk 47 containing telephone answering device 48 and CD 49. Then, step 52, for each of a group of three-dimensional objects which are objects which could be chosen for interactive functions by the viewer, such as objects 48 and 49 in FIG. 2, there is respectively created and stored for each of such objects an enlarged image of the object. This image is stored associated with the object. Next, step 54, there is stored in the system a plurality of user interactive computer programs, i.e. those programs having interactive functions for which the user would select particular objects such as telephone answering object 48 or CD object 49 and would, in response, to such a selection be presented with the enlarged images of such objects as previously described.

Next, step 55, each of the objects is assigned a starting position in the workspace which is stored. Then, step 56, a conventional viewer navigation means is provided so that the viewer may navigate within the workspace from viewpoint to viewpoint.

Figure 5B:
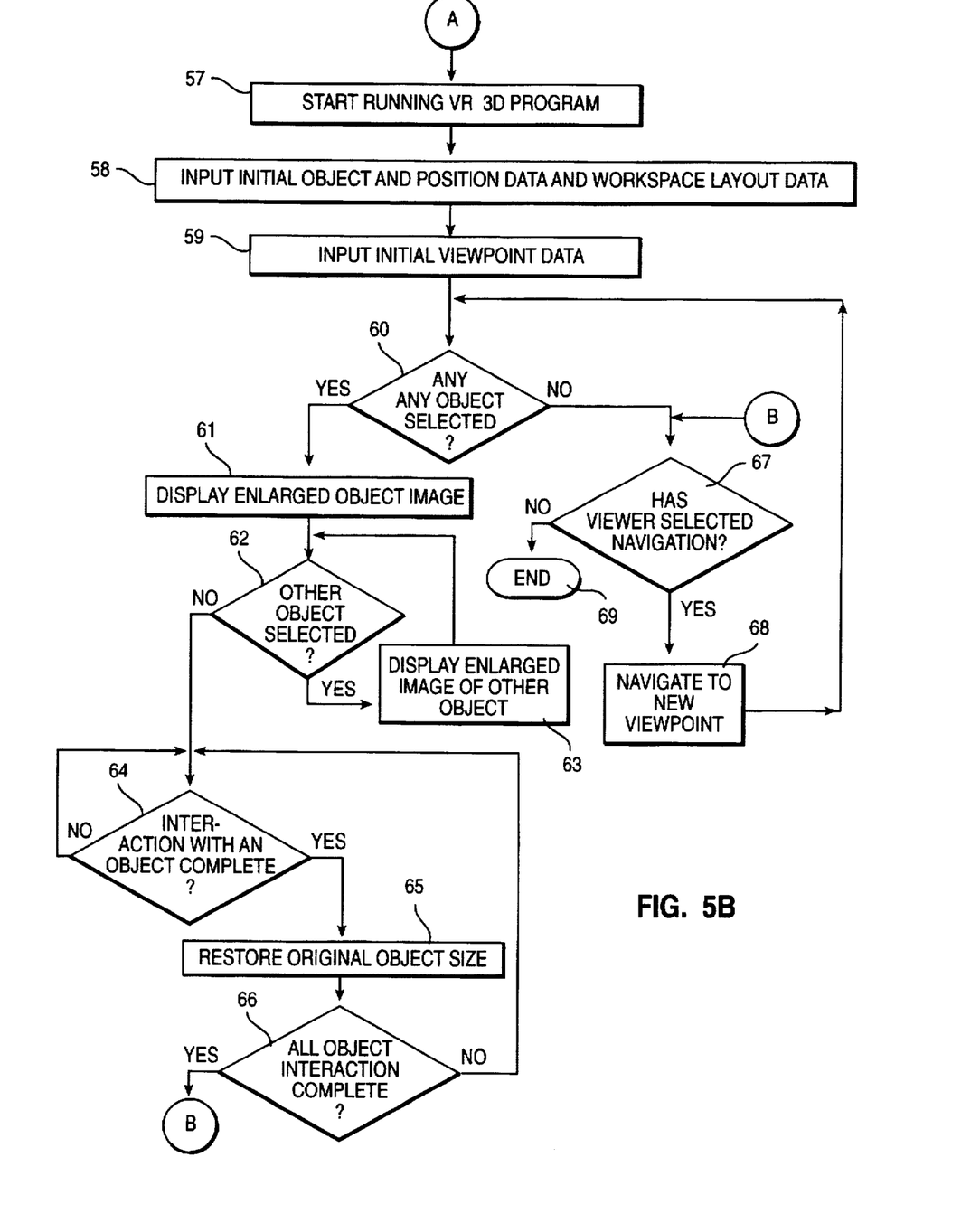

The process then proceeds to point A in FIG. 5B where the created virtual reality workspace program is run, step 57. As previously mentioned, the program is run on a system such as that shown in FIG. 1 with the particular application programs herein being loaded on RAM 14 connected to visual display buffer 36 which forms the stored images via frame buffer 39 controlling the display monitor 38. The program initially sets up the workspace layout on the display, step 58. It also inputs and sets up objects and their positions in the threedimensional workspace. Initial viewpoint data is input, i.e. the system is navigated by the viewer to the initial viewpoint, step 59, which may be, for example, the viewpoint of FIG. 2. At this point, decision block 60, a determination is made as to whether the viewer has selected an object for functional interaction. If he has, then, step 61, an enlarged image of the selected object is displayed. For example, with respect to FIG. 3, since telephone answering device 48 has been selected, its enlarged image 48' is displayed in FIG. 3. Next, decision block 62, a further determination is made as to whether another object has been selected for functional interaction. If, as is the case in FIGS. 2 and 3, an additional object, i.e. CD 49, FIG. 2, is selected, then step 63, FIG. 5B, the enlarged image 49', FIG. 3, of the object is displayed and the system is returned to decision block 62 to determine if there are any other selected objects. If, as in the present case, only two objects have been selected, then the output from decision block 62 flows to decision block 64 where a determination is made as to whether the interaction with an object is complete. If the interaction is not complete, then the output returns to decision block 64 and the monitoring continues. On the other hand, if, as in the present case, the interaction is complete, i.e. with respect to telephone answering device 48', FIG. 3, then the system proceeds to step 65 where the object is returned to its original or default real world size, i.e. FIG. 4 wherein telephone answering device 48' is returned to its real world smaller size.

At this point the system flows to decision block 66 wherein a determination is made as to whether interaction with all of the objects is complete. If the interaction with one or more of the selected objects is still not complete, the system branches back to decision block 64 where the individual objects continue to be monitored. On the other hand, if a determination is made that all interaction is complete, then as shown, the flow branches to point B, i.e. the input to decision block 67 which determines if the viewer or user has selected a navigation step. If the viewer has selected a navigation step, the system navigates, step 68, to the new viewpoint and the system returns to initial decision block 60 where a determination is commenced as to the objects selected at the new viewpoint. On the other hand, if a determination from decision block 67 is made that the viewer has selected no further navigation, then, for the purposes of this embodiment, the session is considered terminated and it is ended, step 69.

It should be noted that while the present invention has been described in its preferred embodiment with respect to the use of enlarged three-dimensional images of the three-dimensional objects, the enlarged images may also be two-dimensional in nature.

It should also be noted that while the embodiments of the present invention have been described involving object oriented programming to construct the object entities on the display, the objects and the associated workspace environments may also be implemented in a more traditional fashion using traditional languages such as "C" or "Basic".

Although certain preferred embodiments have been shown and described, it will be understood that many changes and modifications may be made therein without departing from the scope and intent of the appended claims.

We claim:

1. In a data processor controlled display system for displaying a plurality of environmentally associated three-dimensional objects which combine to form a virtual three-dimensional workspace, means for displaying a set of said three-dimensional objects, said objects in said set being user interactive functional objects and each having a normal size realistically consistent with said environmentally associated objects, means for storing for each of said functional objects in said set, at least one enlarged image of said object;

user interactive means for selecting an object from said set for functional interaction;

means responsive to said selection, for displaying the enlarged image of said selected object, and means for returning the display of said selected object to its normal size upon the completion of said functional interaction with said selected object.

2. The display system of claim 1 wherein said enlarged image is a three-dimensional image of said object.

3. The display system of claim 1 wherein said enlarged image is a two-dimensional image of said object.

4. The display system of claim 1 wherein said means for returning to normal size operates automatically in response to the completion of said functional interaction.

5. In a data processor implemented method for displaying a plurality of environmentally associated three-dimensional objects which combine to form a virtual three-dimensional workspace comprising, displaying a set of said objects, said objects in said set being user interactive functional objects and each having a normal size realistically consistent with said environmentally associated objects, storing for each of said functional objects in said set, at least one enlarged image of said object, user interactively selecting an object from said set for functional interaction, displaying the enlarged image of said selected object in response to said selection, and returning the display of said selected object to its normal size upon the completion of said functional interaction with said selected object.

6. The method of claim 5 wherein said enlarged image is a three-dimensional image of said object.

7. The method of claim 5 wherein said enlarged image is a two-dimensional image of said object.

8. In a computer readable program having data structures included on a computer readable medium which cause the display of a plurality of environmentally associated three-dimensional objects which combine to form a virtual three-dimensional workspace, means for displaying a set of said three-dimensional objects, said objects in said set being user interactive functional objects and each having a normal size realistically consistent with said environmentally associated objects, means for storing for each of said functional objects in said set, at least one enlarged image of said object;

user interactive means for selecting an object from said set for functional interaction;

means responsive to said selection, for displaying the enlarged image of said selected object, and means for returning the display of said selected object to its normal size upon the completion of said functional interaction with said selected object.

9. The computer program of claim 8 wherein said enlarged image is a three-dimensional image of said object.

10. The computer program of claim 8 wherein said enlarged image is a two-dimensional image of said object.

* * * * *